M. HESS.
PIPE ORGAN.
APPLICATION FILED JULY 11, 1917.
1,314,327.
Patented Aug. 26, 1919.
3 SHEETS—SHEET 1.
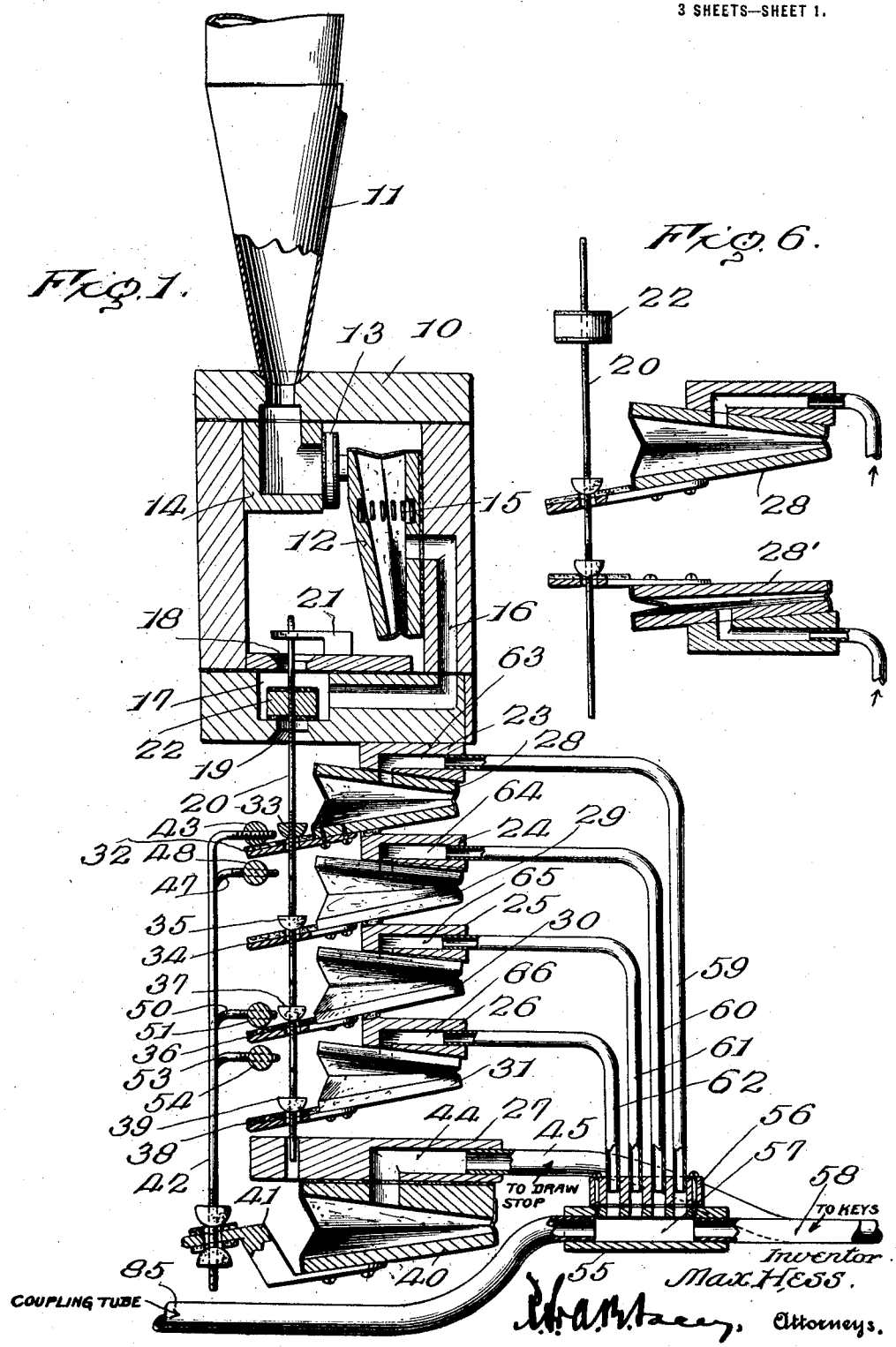

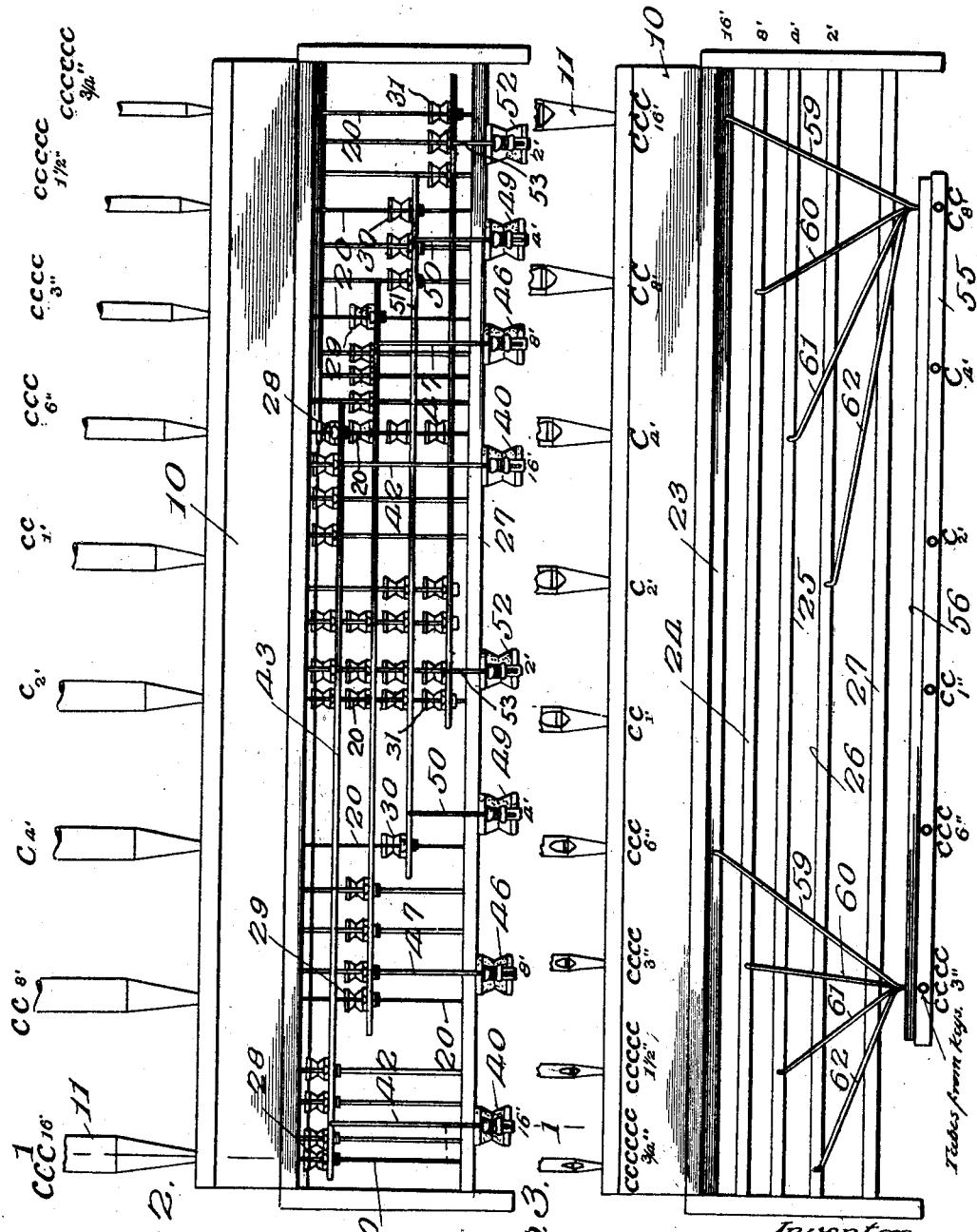

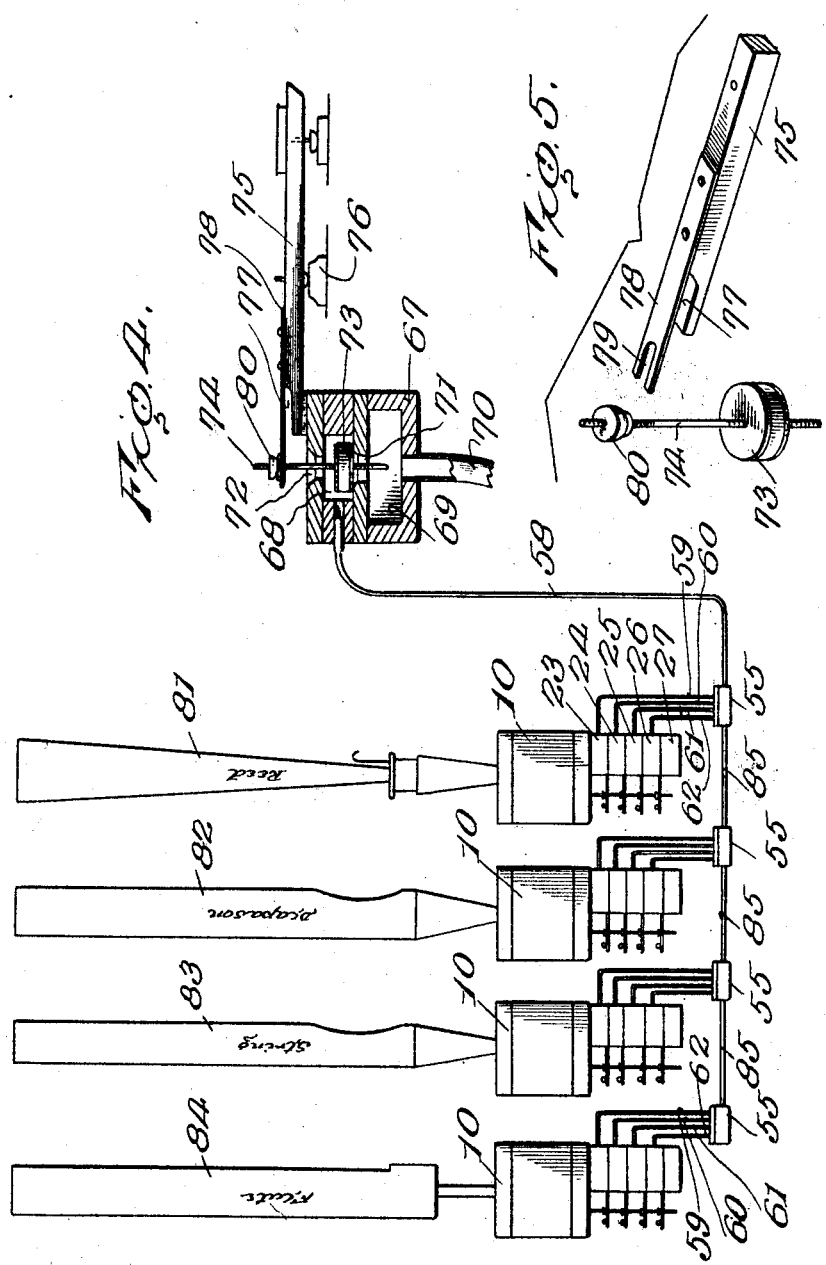

UNITED STATES PATENT OFFICE.

MAXIMUSS HESS, OF NASHVILLE, TENNESSEE, ASSIGNOR OF ONE-HALF TO FRANK A. LEATHERMAN, OF NASHVILLE, TENNESSEE.

PIPE-ORGAN.

1,314,327.     Specification of Letters Patent.     Patented Aug. 26, 1919.

Application filed July 11, 1917. Serial No. 179,840.

*To all whom it may concern:*

Be it known that I, MAXIMUSS HESS, a citizen of the United States, residing at Nashville, in the county of Davidson and State of Tennessee, have invented certain new and useful Improvements in Pipe-Organs, of which the following is a specification.

This invention relates to an improved organ and has as its primary object to provide an arrangement wherein the pipes of each tone series will all be controlled from a single wind chest and wherein the pipes will be so connected with the keys that said pipes may, by means of the draw stops, be selectively sounded in sets each corresponding to an ordinary stop or register of pipes and each numbering as many pipes as there are keys in the manual.

A further object of the invention in this connection is to provide an arrangement wherein when any of the pipes of one set are of a pitch occurring in any of the other sets, the same pipes will be used in all of the sets for such recurring pitches.

The invention has as a further object to provide an arrangement wherein the keys of the manual will each be connected with such of the pipes as represent the recurrence of the note of that key in the different stop sets of all the series and wherein the stops of the different pipe series will be operable to control the speaking of only such of the pipes as belong to the set of the stop selected for thus properly grouping the pipes of any one series when it is desired that the pipes of a particular set of such series shall speak under the control of the manual.

And a further object of the invention is to provide a construction wherein the stops of the respective pipe series may be independently operated to select any desired number of the respective stop sets of the different series so that all of the said sets so selected may simultaneously speak under the control of the manual.

Other and incidental objects will appear as the description proceeds.

In the drawings wherein I have illustrated the preferred embodiment of the invention and wherein similar reference characters designate corresponding parts throughout the several views:

Figure 1 is a fragmentary vertical sectional view showing one of the wind chests of the organ and the system of connecting the keys with certain different pipes of the wind chest as well as the arrangement of the stop action for controlling the speaking of the pipes.

Fig. 2 is a diagrammatic rear elevation illustrating the manner in which the stops of one series of pipes are arranged for selecting the said pipes into different pitched sets.

Fig. 3 is a diagrammatic front elevation illustrating the manner in which each key is connected with such of the pipes of a series as represent the recurrence of the note of that key in the family.

Fig. 4 is a diagrammatic end elevation showing the different series of pipes and the system employed whereby each key is connected with all the pipes in each series as represent the recurrence of the note of such key in the said series, this view also showing the key valve box in section and illustrating the mounting of a typical key, Fig. 5 is a detail perspective view showing the type of connection employed between the keys and the controlling valves thereof, and Fig. 6 is a fragmentary sectional view showing a slight modification of the invention.

In carrying out the invention, I employ a wind chest 10 in connection with each series of pipes. This wind chest is elongated to accommodate a series of pipes encompassing the range of the different stops of that series to be all controlled from the one wind chest. Consequently, in the construction of an ordinary organ the chest 10 will accommodate a series of ninety-seven pipes beginning with low C of the sixteen foot stop and ending with top C or the fourth C above middle C of the two foot stop, this being the usual range of an ordinary pipe series. However, it will be understood that either a greater or less number of pipes may be employed in connection with the wind chest of each series, as desired. In Fig. 1, the pipe representing 100 low C of the sixteen foot stop for the series of pipes associated with the wind chest 10, has been indicated at 11. All of the pipes of the series are similarly connected with the chest and since each series of pipes is connected with the keys and controlled by stops in a similar manner, one series will be first described and the system employed for connecting the several series with the keys will then be explained.

Mounted within the chest 10 are a plurality of pneumatics 12, one for each of the pipes of the series. These pneumatics are equipped with valves 13 normally seating against a passage rail 14 for shutting off communication between the wind chest and the pipes. Arranged within the said pneumatics are suitable springs 15 normally tending to distend the said pneumatics and hold the valves 13 closed. Leading from the pneumatics 12 are passages 16 communicating at their lower extremities with valve chambers 17 having passages 18 communicating with the wind chest and 19 leading to the outer air. Projecting through the valve chambers 17 are valve rods 20 slidably received at their upper extremities by a guide rail 21 and equipped with valves 22 arranged within the chambers 17. As will be understood, one of the valves 22 is, of course, provided for each of the pipes of the series. The valve rods 20 of the series are all arranged in alinement and the valves 22 normally gravitate to close the vents 19 and establish communication between the wind chest and the pneumatics 12 through the passages 18, valve chambers 17 and passages 16. Thus, the wind pressure within the chest 10 will supplement the pressure of the springs 15 of the pneumatics for normally holding the valves 13 of the said pneumatics closed. By lifting upon the valve rods 20 to close the passages 18 by the said valves, communication will be cut off between the wind chest and pneumatics 12, while at the same time communication will be established between the said pneumatics and the vents 19. Consequently, the wind pressure within the chest will then act upon the said pneumatics to open the valves 13 and cause the speaking of the pipes.

Connected with the chest 10 is a plurality of spaced horizontally arranged pneumatic rails which, for convenience, have been designated at 23, 24, 25 and 26 respectively. Mounted below these rails and also supported upon the chest 10 is a horizontally arranged stop action rail 27 extending parallel to the lowermost pneumatic rail 26. Mounted upon the pneumatic rail 23 is a series of pipe control pneumatics 28 equal in number to the number of pipes included in the sixteen foot stop. This series would therefore comprise sixty-one pneumatics to correspond to the number of keys of the manual, the ordinary manual including this number of keys. The rail 24 is equipped with a similar series of sixty-one pneumatics 29 for the eight foot stop, the rail 25 with a series of sixty-one pneumatics 30 for the four foot stop and the rail 26 with a similar series of sixty-one pneumatics 31 for the two foot stop. The pneumatics of the series 28 are provided with lever arms 32 arranged to slidably receive the rods 20 of sixty-one of the valves 22 successively, beginning with the valve controlling the speaking of the pipe low C of the sixteen foot stop and ending with the valve controlling the speaking of the pipe high C of such stop. These lever arms are disposed to engage with buttons 33 upon the said rods for lifting such of the valves. The pneumatics of the series 29 are provided with similar lever arms 34 arranged to slidably receive the rods 20 of sixty-one of the valves 22 successively, beginning with the valve controlling the speaking of the pipe low C of the eight foot stop or tenor C of the sixteen foot stop and ending with the valve controlling the speaking of the pipe high C of the eight foot stop. The lever arms 34 are disposed to engage with buttons 35 upon the said valve rods for lifting such number of the valves. In like manner, the pneumatics of the series 30 are provided with lever arms 36 arranged to slidably receive the rods 20 of sixty-one of the valves 22 successively, beginning with the valve controlling the speaking of the pipe low C of the four foot stop or middle C of the sixteen foot stop and ending with the valve controlling the speaking of the pipe high C of the four foot stop. The lever arms 36 are disposed to engage with buttons 37 upon the said rods for lifting such of the valves. As in the instance of the other series, the pneumatics of the series 31 are provided with lever arms 38 arranged to slidably receive the rods 20 of sixty-one of the valves 22 successively, beginning with the valve controlling the speaking of the pipe low C of the two foot stop or C above middle C of the sixteen foot stop and ending with the valve controlling speaking of the pipe high C of the two foot stop. The lever arms 38 are disposed to engage with buttons 39 upon the said rods for lifting such of the valves. It is now to be observed that the pneumatics of any one of the series 28, 29, 30 or 31 may be collapsed to lift such of the valves as are connected with that series even though certain of the pneumatics of one or more of the other series are also connected therewith since the valve rods are mounted for upward movement independently of the lever arms of the said series of pneumatics. Consequently, the series of pneumatics 28 may control the speaking of all of the pipes of the sixteen foot stop independently of the series of pneumatics 29, 30 or 31. In like manner, the series of pneumatics 29 may control the speaking of all of the pipes in the eight foot stop independently of the other series of pneumatics, and so on in connection with each series.

Mounted upon the stop action rail 27 is the stop action which, generally stated, comprises several stop rails having a plurality of stop action pneumatics connected therewith, one pair to each rail. The stop rails are arranged to respectively lock one of the series of pneumatics 28, 29, 30 and 31 inactive and are movable by the said stop action pneumatics for releasing the pneumatics of said series.

Taking up the stop action in detail, it will be seen that said action includes pneumatics 40 connected to the stop-action rail 27 at suitable longitudinally spaced points and provided with lever arms 41 to which are secured upstanding rods 42. Extending between the upper ends of the said rods is a stop rail 43 arranged to engage over the outer extremities of the lever arms 32 of the series of pneumatics 28 for normally locking the said pneumatics distended or inactive. Since the series of pneumatics 28 is arranged to control the speaking of the sixty-one pipes of the sixteen foot stop, the stop rail 43 in being mounted to coöperate with all of the sixty-one pneumatics of the said series, will govern the selective sounding of the pipes of the sixteen foot stop as a sixteen foot stop set. Leading through the stop action rail 27 from the pneumatics 40 are passages 44 with which are connected tubes 45 communicating at the organ desk with the stop control for the sixteen foot stop. Such control has not been shown since the said control may be of any approved character. However, it should be stated that the said control is so connected with a suitable vacuum chest and with the tubes 45 that upon the opening of the said control, the pneumatics 40 will be simultaneously collapsed for lifting the stop rail 43 and consequently permitting the active movement of the series of pneumatics 28.

The stop action further includes stop pneumatics 46 upon the stop action rail 27. These pneumatics are similar to the pneumatics 40 and are provided with lever arms carrying upstanding rods 47 to which is connected a stop rail 48 similar to the stop rail 43 and arranged to engage over the outer extremities of the lever arms 34 of the series of pneumatics 29 for normally locking these pneumatics inactive. This rail will, therefore, govern the selective sounding of the pipes of the eight foot stop as an eight foot stop set. The pneumatics 48 are connected with a suitable eight foot stop control at the organ desk in a manner similar to the pneumatics 40 so that by collapsing the pneumatics 46 under the influence of the said control, the stop rail 48 will be lifted to the position illustrated in Fig. 1 for permitting the active movement of the series of pneumatics 29.

The stop action also includes spaced pneumatics 49 upon the stop action rail 27, being similar to the pneumatics 40 and 46. The lever arms of the pneumatics 49 carry upstanding rods 50 between the upper extremities of which extends a stop rail 51 arranged to engage over the outer extremities of the lever arms 36 of the series of pneumatics 30 for normally locking these pneumatics inactive. The rail 51 will, therefore, govern the selective sounding of the pipes of the four foot stop as a four foot stop set. The pneumatics 49 are connected with a four foot stop control at the organ desk in a manner similar to the pneumatics 40 so that upon the operation of the said control, the pneumatics 49 will be collapsed to raise the stop rail 51 and thus permit the operation of the series of pneumatics 30.

The stop action still further includes spaced pneumatics 52 upon the stop action rail 27, being also similar to the pneumatics 40. The lever arms of the pneumatics 52 are provided with upstanding rods 53 between the upper ends of which extends a stop rail 54 arranged to engage over the outer extremities of the lever arms 38 of the series of pneumatics 31 for locking these pneumatics inactive. The rail 54 will, therefore, govern the selective sounding of the pipes of the two foot stop as a two foot stop set. The pneumatics 52 are connected in a manner similar to the pneumatics 40 with a stop control key at the organ desk for the two foot stop so that by means of such control, the pneumatics 52 may be collapsed to raise the stop rail 54 to the position shown in Fig. 1 of the drawings for permitting the operation of the series of pneumatics 31.

As will now be clear in view of the preceding description, and as particularly shown in Fig. 2 of the drawings, the stop rails 43, 48, 51 and 54 will each control a set of sixty-one pneumatics representing the different stop sets of the pipes of the series and collectively will control all of the pneumatics included in the series 28, 29, 30 and 31 for normally maintaining all of the pipes silent. Furthermore, it will be clear, that the sixteen foot stop control may be operated to lift the stop rail 43 for permitting the active movement of the series of pneumatics 28 while the series of pneumatics 29, 30 and 31 will be held inactive. In like manner, the eight foot stop control may be operated to lift the rail 48 for permitting the operation of the series of pneumatics 29 while the other series of pneumatics will be held inactive and so on in connection with each of the stop rails 51 and 54 for rendering either of the series of pneumatics 30 or 31 active while the other series of pneumatics will be held inactive. The purpose of this arrangement will presently appear.

Suitably located with respect to the pneumatic rails 23, 24, 25 and 26 is a junction rail 55 upon the upper side of which is mounted a strip 56 connected with the said rail by screws or other suitable fastening devices so that the strip may be easily removed. The rail 55 at suitable points spaced longitudinally thereof is provided with transverse passages therethrough, one of which has been shown at 57. These passages correspond in number to the number of the keys of the manual and each receives a tube such as is shown at 58 from one of the keys. Consequently, for the ordinary manual the rail 55 will be provided with sixty-one of the passages 57 and for the sake of convenience, the tube 58 will be assumed to lead from the key of the manual denoted as low C. Communicating with each of the passages in the junction rail are four tubes 59, 60, 61 and 62 respectively. The tubes connected with the passage 57 will be referred to by these numerals. At their lower ends these tubes are fitted into the strip 56 above the said passage. The tube 59 is, as diagrammatically shown in Fig. 3, connected with a passage 63 communicating with that pneumatic of the series 28 controlling the speaking of the pipe 11 or low C of the sixteen foot stop set. The tube 60 is connected at its upper end with a passage 64 in the rail 24, which passage communicates with that pneumatic of the series 29 controlling the speaking of the pipe low C of the eight foot stop set or tenor C of the sixteen foot stop set. The tube 61 is connected at its upper end with a passage 65 through the rail 25, which passage communicates with that pneumatic of the series 30 controlling the speaking of the pipe low C of the four foot stop set or middle C of the sixteen foot stop set. The tube 62 is connected at its upper end with a passage 66 through the rail 26, which passage communicates with that pneumatic of the series 31 controlling the speaking of the pipe low C of the two foot stop set or C above middle C of the sixteen foot stop set.

The tube 58 is carried to a key valve box 67 and is connected with a valve chamber 68 of a series of valve chambers in the box. These valve chambers correspond in number to the number of keys in the manual and, of course, a tube corresponding to the tube 58 is connected with each of the valve chambers. The valve box is formed with a vacuum chamber 69 from which leads a tube 70 connected with a suitable vacuum chest. Leading from the valve chamber 68 is a passage 71 communicating with the vacuum chamber 69 of the box and also leading from the valve chamber is a vent 72. Fitted within the valve chamber 68 is a control valve 73 having a stem 74 projecting up through the vent 72. The tube 58 is normally vented through the vent 72. However, upon the lifting of the control valve 73 to close said vent communication will be established through the vent 71 between the pipe 58 and the vacuum chamber 69 of the valve box. Since all of the valves of the valve box are identical in construction and are mounted and operated in a similar manner, only one valve has been described. Furthermore, since all of the keys of the manual are similarly connected with the control valves therefor, only that key connected with the valve 73 will be described. Such key has been indicated at 75 and for convenience, this key will be considered as representing low C of the manual. The key 75 is mounted in any approved manner upon a balance rail 76 and is cut away at its inner end as indicated at 77. Mounted upon the upper side of the key at its inner extremity is a resilient valve-lifting strip 78 arranged to overhang the cut away portion of the key and provided at its outer end with a notch 79 to freely receive the valve stem 74. Adjustable upon the said stem to coact with the strip 78 is a nut or stop 80. Thus, when the key is depressed the strip 78 will act to unseat the valve and owing to the resiliency of the strip, this strip will tend to impart a corresponding resiliency to the touch of the key.

It is now to be observed that the key 75, low C of the manual, will control the speaking of the pipe low C of the sixteen foot stop set, low C of the eight foot stop set, low C of the four foot stop set, and low C of the two foot stop set. Each key of the manual is thus connected in the manner described with reference to the key 75, through the junction rail 55 and four tubes 59, 60, 61 and 62 with corresponding pipes of the series representing the recurrence of the note of that key in the several stop sets of the series. Consequently, it has been deemed sufficient to show and describe the manner in which one key is connected with such of the pipes of the series as represent the recurrence of the note of that key in the series. However, it should be noted that by disconnecting the strip 56, the chest 10 together with the pneumatic rails 23, 24, 25, 26 and 27 and associated parts as well as all of the tubes connected with the said strip may be bodily removed or dismounted without molesting the junction rail 55. This provides a convenient arrangement should it be desired to repair any of the parts of the action.

Attention is now directed to the fact that when the key 75 is actuated to lift the valve 73, suction chamber 69 will be connected through tube 58 with all of the tubes 59, 60, 61 and 62. Consequently, such suction will tend to simultaneously actuate the four pneumatics connected with the said tubes and which, as previously described, are respectively arranged in the series 28, 29, 30 and 31. However, since the stop rails 43, 48, 51 and 54 are arranged to normally hold the pneumatics of all of the said series inactive, only that pneumatic will be actuated which is included in the set of the stop rail lifted by the stop control for the said rail. Consequently, should it be desired to cause the pipe low C in the sixteen foot stop set to speak, the corresponding stop control would be actuated to lift the stop rail 43. Then when the key 75 was depressed the pneumatic in the series 28 connected with the pipe 59 would be permitted to collapse or actively move under the influence of the suction from the key valve box for lifting the corresponding valve 22 and thus causing the speaking of the pipe 11 or the pipe low C of the sixteen foot stop set. At the same time the other pneumatics connected with the key and respectively arranged within the series 29, 30, and 31 would be held inactive by the stop rails 48, 51 and 54. Consequently, only the one pipe would speak under the control of the key 75. However, it will of course be understood that upon the lifting of the stop rail 43 by the sixteen foot stop control, all of the pneumatics in the series 28 would be freed for active movement so that all of the pipes in the sixteen foot stop set could accordingly be caused to speak under the control of the key manual. In like manner, all of the pipes in the eight foot stop set, the four foot stop set, or the two foot stop set could be caused to speak as a selected set under the control of the key manual by selectively actuating the stop controls of the respective sets to lift the corresponding stop rails. Nevertheless it will be seen that by lifting any desired two or more of the stop rails of the stop action, the pipes included in the stop sets controlled by the said rails may be caused to simultaneously speak from the key manual. In other words, assuming the stop rail 48 of the eight foot stop set to be lifted and the stop rail 54 of the two foot stop rail to be also lifted, as shown in Fig. 1, then all of the pipes in the series included in such stop sets would simultaneously speak under the control of the key manual.

Having thus described the construction and operation of a single pipe series, the manner in which the several pipe series of the organ are connected and operated from the key manual, will now be described. In this connection, particular attention is directed to Fig. 4 of the drawings wherein the series of reed pipes has been diagrammatically illustrated at 81, the diapason series at 82, the string series at 83 and the flute series at 84. These pipe series and associated parts each represent a duplication of the pipe previously described in detail, the only difference being in the character of the pipes. Consequently, each of the said pipes series will include, in the instance taken, a total of ninety-six pipes mounted upon a single wind chest and controlled by a stop action to be selectively sounded in different pitched sets of sixty-one pipes each. While I have shown the use of four pipe series, still it will be understood that either a greater or less number of pipe series may be employed as desired. Associated with the wind chest of each of the pipe series is one of the junction rails 55 from which lead the tubes 59, 60, 61 and 62 for each of the keys of the manual to the proper pneumatics of the series 28, 29, 30 and 31 of that pipe series, as previously described. Extending between the junction rails and connecting corresponding passages like the passage 57 thereof are tubes 85. Thus, these tubes will connect with each key of the manual such of the pneumatics in the several series of pneumatics of the different wind chests as control the speaking of the particular pipes representing the recurrence of the note of that key in all of the pipe series. It will therefore be seen that since each pipe series is provided with its own stop action which is to be controlled from the organ desk, the pipes of any one series may be caused to speak under the control of the manual while the pipes of the other series will be silent. In this connection, it should be remembered that the stop rails of each pipe series are arranged to normally maintain all of the pipes of that series silent. Moreover, it will be seen that any desired stop set or sets in one series of pipes may be caused to speak simultaneously with any desired stop set or sets in any of the other pipe series. For instance, the sixteen foot set of reeds could be coupled with the four foot set of flutes, to speak simultaneously under the control of the key manual while all of the other pipes in the several series would be silent. It will accordingly be seen that I provide an arrangement whereby the number of pipe series in the organ may be multiplied as desired while at the same time any one stop set of each series may alone be caused to speak under the control of the key manual or any combination of the different stop sets of all of the pipe series may be caused to simultaneously speak under the control of the key manual.

In Fig. 6 of the drawings, I have illustrated a slight modification of the invention to adapt the structure to the use of wind pressure instead of suction, as previously described. In the preferred form of the invention the pneumatics of the several series 28, 29, 30 and 31 are arranged to be collapsed for lifting the valves 22. In this modified structure the said series of pneumatics, one of which has been indicated at 28', are reversed and are thus disposed to be distended by wind pressure for lifting the valves 22. In some instances it may be found desirable to use wind pressure instead of suction for actuating the several series of pipe control pneumatics and it will be seen that this modified structure provides a simple and convenient arrangement whereby this may be accomplished.

Having thus described the invention, what is claimed as new is:

1. A pipe organ including a wind chest, a series of sound producing devices connected therewith, valves controlling the speaking of said devices individually, the valves being provided with valve rods, pneumatics having arms engaging said rods, the pneumatics being arranged in groups and certain of the rods engaged by one group being common to another group, and stop means each normally engaging all of the arms of a group of pneumatics.

2. A pipe organ including a wind chest, a series of sound producing devices connected therewith, a plurality of pneumatic rails arranged adjacent the wind chest, a group of pneumatics mounted upon each rail, valves controlling the speaking of said devices individually, the valves being operable by the pneumatics, and stop means each normally engaging a group of pneumatics but operable for releasing the groups selectively.

3. A pipe organ including a wind chest, a series of sound producing devices connected therewith, a plurality of pneumatic rails arranged adjacent the wind chest, a group of pneumatics mounted upon each rail, means controlling the speaking of said devices individually and operable by the pneumatics, and stop means each normally engaging a group of pneumatics but operable for selectively releasing the groups, certain of the pneumatics in each of the groups being each connected with a common corresponding key of the organ manual.

4. A pipe organ including a wind chest, a series of sound producing devices connected therewith, a plurality of pneumatic rails mounted adjacent the wind chest, a group of pneumatics mounted upon each rail, means controlling the speaking of said devices individually and operable by said pneumatics, stop means each normally engaging a group of pneumatics but operable for releasing the groups selectively, a junction rail having passages therein each adapted for operative connection with a key of a manual, and means connecting each of said passages with a pneumatic in each of said groups.

5. A pipe organ including a wind chest, a series of sound-producing devices connected therewith, a plurality of pneumatic rails mounted adjacent the wind chest, a group of pneumatics mounted upon each rail, means controlling the speaking of said devices individually and operable by the pneumatics, stop means each normally engaging a group of pneumatics but operable for releasing the groups selectively, a junction rail provided with passages each adapted for operative connection with a key of a manual, a strip mounted upon the junction rail, and means engaged with the strip and connecting each of said passages with a pneumatic in each of said groups.

6. A pipe organ including a wind chest, a series of sound producing devices connected therewith, valves controlling the speaking of said devices individually, groups of pneumatics for actuating said valves, the pneumatics being provided with arms, a stop action rail, stop action pneumatics mounted upon said rail, and stop rails connected with the said stop action pneumatics and each normally engaging all of the arms of a group of said first mentioned pneumatics for locking such pneumatics inactive.

7. A pipe organ including a wind chest, a series of pipes connected therewith, means controlling the speaking of the pipes individually, means for actuating said first mentioned means and arranged in groups one for each of the draw stops of the series, and manually controlled stop rails each normally locking a group of said second mentioned means inactive but movable to free the groups selectively whereby the pipes may be individually sounded in selective stop sets.

8. A pipe organ including a wind chest, a series of pipes connected therewith, means controlling the speaking of the pipes individually, means for actuating said first mentioned means and arranged in groups one for each of the draw stops of the series, stop means each normally locking a group of said second mentioned means inactive but movable to free the groups selectively whereby the pipes may be individually sounded in selective stop sets, and means connecting each key of the organ manual with one of said second mentioned means in each group thereof.

9. A pipe organ including a wind chest, a series of pipes connected therewith, means for controlling the speaking of said pipes individually, means for actuating said first mentioned means and arranged in groups one for each of the draw stops of the series, certain of said first mentioned means actuated by one group being common to another group, stop means each normally locking a group of said second mentioned means inactive but movable to free the groups selectively whereby the pipes may be individually sounded in selective stop sets having certain of the pipes of one set common to another set, and means connecting each key of the organ manual with one of said second mentioned means in each group thereof.

10. A pipe organ including a wind chest, a series of pipes connected therewith, means for controlling the speaking of the pipes individually, means for actuating said first mentioned means, said second mentioned means being arranged in groups one for each draw stop of the series, and stop means each normally locking a group of said second mentioned means inactive but movable to selectively release said groups.

11. A pipe organ including a wind chest, a series of pipes connected therewith, means controlling the speaking of the pipes individually, means for actuating said first mentioned means and arranged in groups one for each draw stop of the series, certain of said first mentioned means actuated by one group being common to another group, and stop means each normally locking a group of said second mentioned means inactive but movable to free said groups selectively whereby the pipes may be individually sounded in selective stop sets having certain of the pipes of one set common to another set.

12. A pipe organ including a wind chest, a series of pipes connected therewith, valves controlling the speaking of the pipes individually, means connected with the valves for actuating said valves and arranged in groups, and stop means each normally locking a group of said first mentioned means inactive but movable to release the groups selectively.

13. A pipe organ including a wind chest, a series of pipes connected therewith, valves controlling the speaking of said pipes individually, means for actuating the valves, said means being arranged in groups having certain of the valves of one group common to another group, and stop means each normally locking a group of said second mentioned means inactive but movable to release the groups selectively.

14. A pipe organ including a wind chest, a series of pipes connected therewith, valves controlling the speaking of said pipes individually, pneumatics for actuating said valves, the pneumatics being arranged in groups having certain of the valves of one group common to another group, and stop means each normally locking a group of pneumatics inactive but movable to release the groups selectively.

15. A pipe organ including a wind chest, a series of pipes connected therewith, valves controlling the speaking of said pipes individually, pneumatics for actuating said valves and arranged in groups, each group being connected with the valves of a stop set of said pipes, and stop means each normally locking a group of pneumatics inactive but movable to release the groups selectively.

16. A pipe organ including a wind chest, a series of pipes connected therewith, valves controlling the speaking of said pipes individually and formed with valve rods, means engaging said rods for actuating the valves and arranged in groups, each group being connected with the valves of a stop set of said pipes, certain of the valves of one group being common to another group and each of said groups engaging the valve rods for movement independent of any of the other groups, and stop means each normally locking a group of said first mentioned means inactive but movable to release the groups selectively.

17. A pipe-organ including a wind chest, a series of pipes connected therewith, valves controlling the speaking of said pipes individually and formed with valve rods, pneumatics engaged with the valve rods and arranged in groups having certain of the rods of one group engaged by the pneumatics of another group, stop means each normally locking a group of pneumatics inactive but movable to release the groups selectively, and means connecting certain of the pneumatic in each of the groups each with a common corresponding key of the organ manual.

18. A pipe organ including a wind chest, a series of pipes connected therewith, valves controlling the speaking of said pipes individually, pneumatics for actuating the valves, arms carried by the pneumatics, the pneumatics being arranged in groups, and stop means each engaging all of the arms of a group of pneumatics and normally locking the pneumatics inactive, said stop means being movable for releasing the groups selectively.

19. A pipe organ including a wind chest, a series of pipes connected therewith, valves controlling the speaking of said pipes individually, pneumatics for actuating said valves, arms carried by the pneumatics, the pneumatics being arranged in groups, and stop rails each engaging all of the arms of a group of pneumatics and normally locking the pneumatics inactive.

20. A pipe organ including a plurality of tone units, each of said units including a single wind chest, a series of pipes connected therewith, means controlling the speaking of the pipes individually, means for actuating said first mentioned means and arranged in groups one for each of the draw stops of the series, stop means each normally locking said second mentioned means inactive but movable to selectively free said groups whereby the pipes may be individually sounded in selective stop sets, a junction rail having a plurality of passages formed therein each communicating with one of the keys of the organ manual, means connecting each of said passages with one of said second mentioned means in each of said groups, and means connecting corresponding passages of the rails of said tone units.

In testimony whereof I affix my signature.

MAXIMUSS HESS. [L. S.]

Copies of this patent may be obtained for five cents each, by addressing the "Commissioner of Patents, Washington, D. C."